United States Patent Office 3,557,508
Patented Jan. 26, 1971

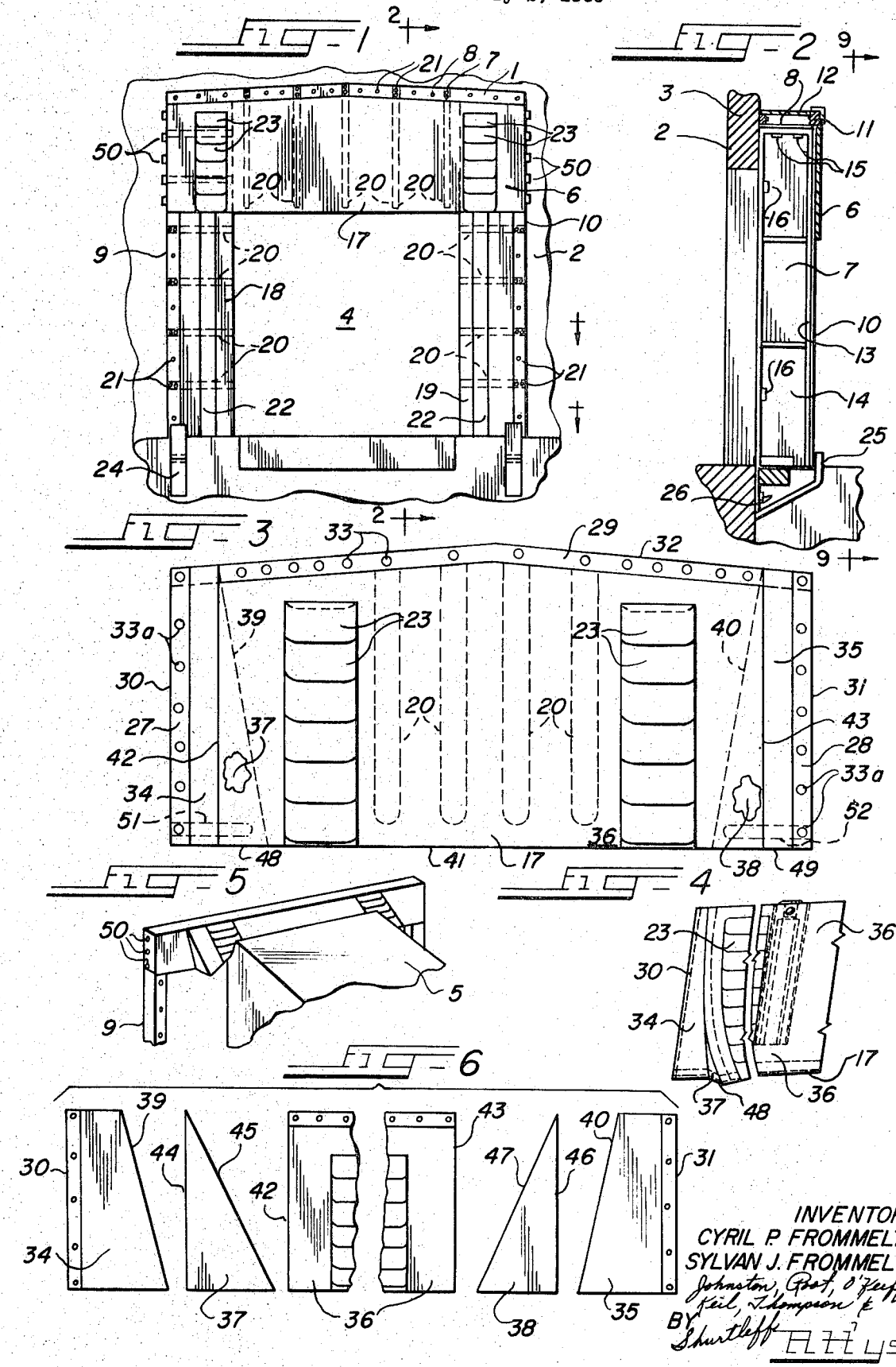

3,557,508
LOADING DOCK SHELTERS
Cyril P. Frommelt and Sylvan J. Frommelt, Dubuque,
Iowa, assignors to Dubuque Awning & Tent Company,
Dubuque, Iowa, a corporation of Iowa
Filed July 2, 1969, Ser. No. 838,389
Int. Cl. E06b 1/04, 1/32, 1/34
U.S. Cl. 52—204                                    10 Claims

ABSTRACT OF THE DISCLOSURE

Loading dock shelter with head curtain which may be fixedly attached at its ends to support, and with pleats embodied therein in a manner to afford a normally flat panel capable of lateral displacement.

BACKGROUND OF THE INVENTION

This invention relates to loading dock shelters.

It is a primary object of the present invention to afford a novel loading dock shelter.

Another object is to afford a novel head curtain or top panel for loading dock shelters.

Loading dock shelters of the retractable type, such as, for example, loading dock shelters of the type shown in our U.S. Letters Patent No. 2,892,463 have been heretofore known in the art. Also, loading dock shelters of the nonretractable type, such as, for example, loading dock shelters of the type shown in our U.S. Letters Patent No. 3,403,489 have been heretofore known in the art. Such loading dock shelters have been highly successful and afford effective shelter for men and materials during the loading and unloading of a truck, or the like, through a warehouse doorway equipped with such shelters.

Loading dock shelters heretofore known in the art have embodied head curtains or top panels engageable with the tops of trucks, or the like, disposed in operative position relative to the shelters. However, such loading dock shelters heretofore known in the art have commonly had several inherent disadvantages such as, for example, embodying a head curtain which was free to flap in the wind; embodying a head curtain which was free to be accidentally displaced to a position wherein it was not in operative position to effectively sealingly engage a truck, or the like, backed against the shelter; embodying a head curtain which, when it was engaged by a truck, was displaced from the remainder of the loading dock shelter so as to permit drafts and rain to pass therebetween; or not affording an effective sealing engagement with the top of a truck, and the like. It is an important object of the present invention to overcome such disadvantages.

Another object of the present invention is to afford a novel loading dock shelter construction which enables the shelter to sealingly engage a truck, or the like, in a novel and expeditious manner.

Yet another object is to insure, in a novel and expeditious manner, effective sealing engagement of the head curtain of a loading dock shelter with a truck, or the like, engaged therewith.

A further object is to afford a novel loading dock shelter wherein the head curtain thereof is effectively restrained against displacement by wind, and the like.

Another object is to afford a novel loading dock shelter embodying flexible side and head panels, wherein the head panel is held in operative relation to the side panels in a novel and expeditious manner.

Another object of the present invention is to afford a novel loading dock shelter which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a front elevational view of a loading dock shelter embodying the principles of the present invention;

FIG. 2 is a longitudinal sectional view taken substantially along the line 2—2 in FIG. 1;

FIG. 3 is a front elevational view of the head curtain or top panel of the loading dock shelter shown in FIG. 1;

FIG. 4 is a fragmentary perspective view of the head curtain shown in FIG. 3, with parts thereof disposed in different position;

FIG. 5 is a fragmentary perspective view of the upper portion of the loading dock shelter shown in FIG. 1, showing, in somewhat diagrammatic form, the head curtain thereof displaced by a truck; and FIG. 6 is an exploded view of the parts of the head curtain shown in FIG. 3, prior to assembly thereof.

DESCRIPTION OF THE EMBODIMENT SHOWN HEREIN

A loading dock shelter 1 embodying the principles of the present invention is shown in the drawings to illustrate the presently preferred embodiment of the present invention. It is shown mounted on an outer wall 2 of a warehouse 3 in surrounding relation to a doorway 4 in the warehouse wall 2, FIG. 1. As will be discussed in greater detail presently, it is operative to afford an effective shelter between a truck 5, FIG. 5, and the doorway 4, when the truck 5 is disposed in normal operative position relative to the doorway 4 for loading and unloading operations to be effected through the rear end of the truck 5 and the doorway 4.

The loading dock shelter 1 is of the same general construction as the loading dock shelter shown in our aforementioned Patent No. 3,403,489, and embodies a front cover 6 mounted on a supporting frame 7 in such position that the front cover 6 is disposed outwardly of the wall 2 of the warehouse 3 in position to be operatively engaged by a truck, such as the truck 5, as will be discussed in greater detail presently.

The supporting frame 7 includes an elongated top wall 8, and two side walls 9 and 10 projecting downwardly from respective opposite ends of the top wall 8. The top wall 8 preferably embodies a wooden frame 11 on which is mounted a top cover 12, preferably made of a single, self-supporting panel of a suitable water-impermeable, light-permeable material, such as, for example, a translucent material comprising a composition of a resin reinforced with glass fibers, readily available on the market. The side walls 9 and 10 of the supporting frame 7 are identical to each other in construction, except that they are mirror images, and each preferably embodies a wooden frame, such as the frame 13 shown in FIG. 2, and an outer side cover, such as the side cover 14 shown in FIG. 2. The side covers 14 are preferably made of the same material as the top cover 12.

The side walls 9 and 10 may be secured to the respective opposite ends of the top wall 8 by suitable means such as bolts or screws 15, FIG. 2, and the frame 7 may be secured to the wall 2 in surrounding relation to the top and sides thereof by a suitable means such as bolts 16.

The cover 6, which is mounted on the supporting frame 7 in outwardly spaced relation to the warehouse 3, embodies a head curtain or top panel 17 and two side curtains or side panels 18 and 19, FIG. 1. The panels 17–19 may be made of any suitable material, but, preferably, they are made of a water-repellent, wear-resistant material, such as, for example, canvas duck or rubber-impregnated nylon fabric.

Each of the curtains 17–19 is substantially rectangular in shape, and, preferably, embodies a plurality of elongated stays 20 extending transversely thereacross in substantially parallel relation to each other, in a manner similar to that disclosed in our aforementioned Pat. No. 3,403,489. The stays 20 may be made of any suitable resilient material, such as, for example, spring steel, and are so disposed in each of the panels 17–19 of the loading dock shelter 1 that they yieldingly urge each of the panels 17–19 to remain in their normal, at-rest position, wherein they extend across the front of the doorway, in substantially parallel relation thereto. In such position, the side curtains 18 and 19 are preferably disposed in uniplanar relation to each other and the top panel 17 projects substantially vertically downwardly from the upper portion of the doorway 4, forwardly of the side panels 18 and 19 in parallel juxtaposition thereto.

The outer longitudinal edge portions of the side curtains 9 and 10, and the upper longitudinal edge portion of the head curtain 17 are secured to the front faces of the side walls 9 and 10 and the front face of the top wall 8 of the supporting frame 7, respectively, by suitable means such as nails or screws 21. The nails or screws 21 are preferably spaced along the curtains 17–19 in such a manner that at least one of them extends through the outer end of each of the stays 20 to thereby afford a firm anchor for the stays 20.

Preferably, each of the side curtains 18 and 19 has a guide stripe 22 on the front face thereof, and extending vertically the full length thereof. The guide stripe 22 is preferably of a suitable brilliant color, such as, for example, yellow, and is disposed on the respective side curtains 18 and 19 in such position that when the loading dock shelter 1 is disposed in operative position on the warehouse 3, the stripes 22 are spaced from each other the same distance as the width of the trucks that the loading dock shelter 1 is primarily intended to accommodate.

The head curtain 17 preferably has two substantially vertically disposed rows of protective flaps 23 so disposed on the front face thereof that, when the loading dock shelter 1 is disposed in assembled position, the rows of flaps 23 are disposed vertically above respective ones of the stripes 22. Each of the flaps 23 are made of suitable material, such as, for example, the aforementioned fabric from which the curtains 17–19 are made, and each is secured along its upper edge portion to the head curtain 17, by a suitable means such as sewing, not shown. The lower edges of the flaps 23 are preferably left loose, and the flaps disposed above the lowermost flap in each of the rows of flaps 23 preferably overlap the flaps disposed immediately therebelow. Such construction affords a particularly effective, wear-resistant protective covering for the front face of the head curtain 17 at the points which it has been found are subject to the most wear, namely, the areas at which the head curtain 17 is normally engaged by the rear corners of the top of a truck disposed in operative position relative to the loading dock shelter 1.

The guide stripes 22 afford an effective target for the driver of a truck backing into operative position relative to the loading dock shelter 1. A truck which engages the loading dock shelter 1 in such a position that neither side of the truck projects outwardly of the guide stripes 22, will effectively engage the curtains 17–19, only, of the loading dock shelter 1, without danger of engaging the supporting frame 7. However, to protect the loading dock shelter 1, and, particularly, the side walls 8 and 9 of the supporting frame 7, from possible damage by an oversize truck or a truck of normal size, which might be backed into improper position relative to the doorway 4, we prefer to afford bumpers 24 and 25 mounted on the wall 2 of the warehouse 3 in position to project forwardly of the side walls 8 and 9, respectively, of the supporting frame 7 in protective relation thereto, FIGS. 1 and 2.

The bumpers 24 and 25 may be made of any suitable material, such as, for example, iron or steel, and are preferably so constructed that they may be secured to the front wall 2 of the warehouse 3 by suitable means such as bolts 26, FIG. 2, in position to project forwardly below, and upwardly in front of the respective side walls 8 and 9 of the supporting frame 7 in such a position as to be effective to engage, and stop the bottom of the box of a truck which might be backed into such position relative to the doorway 4 that it would otherwise engage either or both of the side walls 8 and 9.

In the preferred form of the cover 6 shown in the drawings, the head curtain 17 is preferably substantially rectangular in shape, and has hems 27, 28 and 29 on the end edges 30 and 31 and the upper longitudinal edge 32 thereof, respectfully. Grommets 33 preferably are mounted in the hem 29 to afford reinforced openings for the insertion of the nails or bolts 21 therethrough. Similarly, grommets 33a are mounted in the hems 27 and 28 for a purpose which will be discussed in greater detail presently.

The head curtain 17 embodies two elongated end portions 34 and 35 disposed on opposite sides of an elongated central portion 36, FIG. 3. Two intermediate portions 37 and 38, FIG. 6, are disposed between the central portion 36 and the end portions 34 and 35, respectively. The inner longitudinal edges 39 and 40 of the end portions 34 and 35 slope away from the edges 30 and 31 thereof from the upper longitudinal edge 32 to the lower longitudinal edge 41 of the head curtain 17, FIG. 6. The central portion 36 is substantially rectangular in shape, and in the normal at-rest position of the head curtain 17 the end edges 42 and 43 thereof project outwardly beyond the inner edges 39 and 40 of the end portions 34 and 35, respectively, and are disposed in inwardly spaced substantially parallel relation to the ends 30 and 31 of the head curtain 17, FIG. 3.

The intermediate portions 37 and 38 are identical in construction, except that in the assembled head curtain 17 they are mirror images of each other, and each is substantially triangular in shape, FIG. 6. The intermediate portion 37 has a longitudinal edge 44 which extends between the upper edge 32 and the lower edge 41 of the head curtain 17 in substantially perpendicular relation thereto. It has another longitudinal edge portion 45 which slopes away from the longitudinal edge 44 from the upper end to the lower end thereof. The intermediate portion 38 has longitudinal edge portions 46 and 47 which correspond to the longitudinal edge portions 44 and 45, respectively, of the intermediate portion 37.

In the assembled head curtain 17, the edge portion 45 of the intermediate portion 37 extends along the edge portion 39 of the end portion 34 and is secured thereto by suitable means, such as, sewing, not shown; the edge portion 44 of the intermediate portion 37 extends along and is similarly secured to the end portion 42 of the central portion 36; the edge portion 47 of the intermediate portion 38 extends along and is similarly secured to the edge portion 40 of the end portion 35; and the edge portion 46 extends along and is similarly secured to the end portion 43 of the central portion 36.

In the assembled head curtain 17, with the portions 34–38 thereof thus secured together, the interconnection of the portions 34 and 36 by the portion 37 and the interconnection of the portions 35 and 36 by the portion 38 afford substantially V-shaped pleats 48 and 49, respectively. The pleats 48 and 49 preferably are disposed between the ends 30 and 31 of the head curtain 17 and the respective adjacent row of flaps 23, FIG. 3.

With this construction, when the assembled head curtain 17 is disposed in normal at-rest position, the intermediate portion 37 is disposed between the end portion 34 and the central portion 36 in substantially parallel juxtaposition thereto, and the intermediate portion 38 is disposed between the end portion 35 and the central portion 36 in substantially parallel juxtaposition thereto. In such position the pleats 48 and 49 are closed. However, both of the pleats 48 and 49 are movable from this closed position to an open position, such as illustrated in FIG. 4 with respect to the pleat 48, wherein the central portion 36 is spaced from the end portions 34 and 35, but remain connected thereto by the intermediate portions 37 and 38, respectively. With this construction of the pleats 48 and 49, when they are disposed in fully open position, the displacement of the central portion 36 from the end portions 34 and 35 is progressively greater from the top edge 32 to the bottom edge 41 of the head curtain 17.

As will be appreciated by those skilled in the art, pleats having a size and configuration different from that shown in the drawings may be used without departing from the broader aspects of the present invention. However, it is preferred that in the construction of the head curtain 17, the longitudinal edges 45 and 47 be disposed at an acute angle to the longitudinal edges 44 and 46 of the intermediate portions 37 and 38, respectively, and that the angle be not substantially less than 5 degrees and not substantially greater than 30 degrees, with the preferred angle being 15 degrees. With this construction, when the head curtain 17 is in normal at-rest position it may be relatively small and compact in size, while affording substantial expansion for effective, wrap-around, sealing engagement with a truck backed into operative position relative to the shelter.

In mounting the head curtain 17 on the supporting frame 7, the upper longitudinal edge portion may be secured to the front face of the top wall thereof by inserting the nails or screws 21 through the grommet 33 in the hem 29, and the hems 27 and 28 may then be extended around the front portion of the side walls 9 and 10, respectively, of the supporting frame 7 and secured to the side faces of the walls 9 and 10, respectively, by suitable means such as nails or screws 50, FIG. 1, inserted through the grommets 33a. When so attached to the supporting frame 7, the head curtain 17 is securely held against accidental displacement, such as, by the wind, so as to insure that it will be disposed in such position that it will be effective to operatively engage a truck, or the like, moved into operative position relative to the loading dock shelter 1. However, although the head curtain 17 is thus securely attached to the supporting frame 7, the pleats 48 and 49 afford a yieldable connection between the secured opposite ends thereof so that when a truck backs into operative position relative to the loading dock shelter 1 and the top thereof engages the head curtain 17, the central portion thereof is free to yield inwardly and wrap itself around the top portion of the truck in good sealing engagement therewith, the pleats 48 and 49 opening to thus permit such movement of the central portion of the head curtain 17.

In the preferred form of the head curtain 17, two stays 51 and 52 are mounted in the lower edge portions of the end portions 34 and 35 thereof, respectively, in closely adjacent parallel relation to the respective lower ends thereof, FIG. 3. The outer ends of the stays 51 and 52 are preferably secured to the side walls 9 and 10 of the supporting frame 7, respectively, by nails or screws 50 extending therethrough, and the stays terminate at their inner ends in outwardly spaced relation to the longitudinal edges 39 and 40 of the end portions 34 and 35, respectively, FIG. 3. The stays 51 and 52 yieldingly urge the end portions 34 and 35 of the head curtain 17 to remain in normal at-rest position, wherein they are disposed in overlying engagement with the front faces of the side curtains 18 and 19, respectively, and, if the head curtain 17 is displaced, the stays 51 and 52 are effective to urge it back toward the normal at-rest position.

From the foregoing it will be seen that the present invention affords a novel loading dock shelter wherein the head curtain 17 thereof, at all times, is effectively held in position relative to the remainder of the loading dock shelter so that it affords an effective protection against wind, rain and cold air.

Also, it will be seen that the present invention affords a novel loading dock shelter wherein the head curtain is effective to sealingly engage the top of a truck, or the like, in a novel and expeditious manner.

Also, it will be seen that the present invention affords a novel loading dock shelter which is practical and efficient in operation and which may be readily and economically produced commercially.

Thus, while we have illustrated and described the preferred embodiment of our invention, it is to be understood that this is capable of variation and modification, and we therefore do not wish to be limited to the precise details set forth, but desire to avail ourselves of such changes and alterations as fall within the purview of the following claims.

We claim:
1. A loading dock shelter comprising
   (a) a front cover,
   (b) means for supporting said cover in position to extend along the top and sides of a doorway in a warehouse wall in outwardly projecting relation to said wall,
   (c) said cover including a flexible top panel mounted on said supporting means in position to extend along the top of such a doorway in position to engage the top of a truck backed into operative position relative to said doorway for loading or unloading of said truck,
   (d) said top panel having elongated pleat means disposed transversely to the vertical height of said panel, and
   (e) said pleat means having
      (1) one position wherein they are disposed in substantially uniplanar relation to the adjacent portions of said panel to thereby afford a substantially smooth uniplanar panel, and
      (2) another position wherein they are disposed substantially transversely to the planes of the adjacent portions of said panel to thereby enable said panel to wrap around the top of said truck with a sealing engagement therewith.
2. A loading dock shelter as defined in claim 1, and in which
   (a) said pleat means comprise two elongated pleats disposed in spaced relation to each other.
3. A loading dock shelter as defined in claim 1, and in which
   (a) said cover is attached along the top and two oppositely disposed sides thereof to said supporting means.
4. A loading dock shelter as defined in claim 3, and which includes
   (a) two flexible resilient, elongated stays
      (1) mounted in respective opposite ends of the lower edge portion of said top panel, and
      (2) each having one end operatively attached to said supporting means.
5. A loading dock shelter as defined in claim 4, and in which
   (a) said pleat means comprise two elongated disposed
      (1) in space relation to each other,
      (2) inwardly of said stays, and

6. A loading dock shelter as defined in claim 1, and in which
 (a) said cover includes
  (1) two flexible side panels mounted on said supporting means in position to extend downwardly behind said top panel and downwardly from said top panel along respective sides of said doorway and extend horizontally across said doorway toward the other side of said doorway in position to sealingly engage the sides of said truck when the latter is disposed in said operative position,
 (b) two flexible resilient, elongated stays are mounted in respective ends of the lower edge portion of said top panel, and
 (c) each of said stays
  (1) has one end operatively attached to said supporting means at a respective side of said doorway, and
  (2) is disposed in position to yieldingly hold an end of said lower edge portion of said top panel against a respective one of said side panels.

7. A loading dock shelter as defined in claim 6, and in which
 (a) said pleat means comprise
  (1) two elongated pleats disposed
   (a') in spaced relation to each other,
   (b') inwardly of an adjacent to respective ones of said stays, and
   (c') in transversely extending relation to the length of said stays.

8. A loading dock shelter comprising
 (a) a front cover,
 (b) means for supporting said cover in position to extend along the top and sides of a doorway in a warehouse wall in outwardly projecting relation to said wall.
 (c) said cover including a flexible top panel mounted on said supporting means in position to extend along the top of such a doorway in position to sealingly engage the top of a truck backed into operative position relative to said doorway for loading or unloading of said truck,
 (d) said top panel having
  (1) two elongated end portions
   (a') each having a longitudinal edge portion attached to said supporting means,
  (2) an elongated central portion disposed between said end portions, and
  (3) two other portions,
   (a') each having
    (1') one edge attached to another longitudinal edge portion of a respective one of said elongated end portions, and
    (2') another edge attached to a respective end of said central portion to afford two pleats,
 (e) said pleats having
  (1) a closed position wherin said other portions are disposed between adjacent ones of said end and central portions in substantially parallel juxtaposition thereto, and
  (2) an open position wherein adjacent ones of said end and central portions are separated from each other a greater distance than in said closed position and said other portions extend transversely therebetween.

9. A loading dock shelter as defined in claim 8, and in which
 (a) said attached one edges of said other portions and said other longitudinal edges of said elongated end portions slope inwardly away from respective ones of said first mentioned longitudinal edge portions of said elongated end portions from the upper edge of said panel toward the bottom edge of said panel.

10. A loading dock shelter as defined in claim 9, and in which
 (a) said ends of said central portion are disposed in substantially parallel relation to said first mentioned edge portions of said elongated end portions, and
 (b) said slope is at an angle of not substantially less than five degrees and not substantially more than thirty degrees.

References Cited

UNITED STATES PATENTS

| | | | |
|---|---|---|---|
| 3,136,356 | 6/1964 | Meurs | 160—179X |
| 3,322,132 | 5/1967 | Rieder et al. | 135—5A |
| 3,403,489 | 10/1968 | Frommelt et al. | 52—204 |

PETER M. CAUN, Primary Examiner

U.S. Cl. X.R.

135—5

PO-1050
(5/69)

UNITED STATES PATENT OFFICE
CERTIFICATE OF CORRECTION

Patent No. 3,557,508　　　　　Dated January 26, 1971

Inventor(s) Cyril P. Frommelt and Sylvan J. Frommelt

It is certified that error appears in the above-identified patent and that said Letters Patent are hereby corrected as shown below:

Column 6, line 74, after "elongated" insert -- pleats --;

Column 7, line 29, "an" should be -- and --.

Signed and sealed this 13th day of April 1971.

(SEAL)
Attest:

EDWARD M. FLETCHER, JR.　　　　　WILLIAM E. SCHUYLER, JR
Attesting Officer　　　　　　　　Commissioner of Patents

Dedication 3,557,508.—*Cyril P. Frommelt* and *Sylvan J. Frommelt*, Dubuque, Iowa. LOADING DOCK SHELTERS. Patent dated Jan. 26, 1971. Dedication filed Mar. 24, 1977, by the assignee, *Dubuque Awning & Tent Company*.

Hereby dedicates to the Public the remaining term of said patent.

[*Official Gazette May 24, 1977.*]